United States Patent
Bosscher et al.

(10) Patent No.: US 9,475,193 B2
(45) Date of Patent: Oct. 25, 2016

(54) UNMANNED GROUND VEHICLE STABILITY CONTROL

(71) Applicant: HARRIS CORPORATION, Melbourne, FL (US)

(72) Inventors: Paul M. Bosscher, West Melbourne, FL (US); Matthew D. Summer, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 178 days.

(21) Appl. No.: 14/617,036

(22) Filed: Feb. 9, 2015

(65) Prior Publication Data
US 2016/0229057 A1  Aug. 11, 2016

(51) Int. Cl.
*B25J 9/16* (2006.01)

(52) U.S. Cl.
CPC ............ *B25J 9/1674* (2013.01); *B25J 9/1602* (2013.01); *B25J 9/1664* (2013.01); *Y10S 901/01* (2013.01); *Y10S 901/02* (2013.01)

(58) Field of Classification Search
CPC ..... B25J 9/1674; B25J 9/1602; B25J 9/1664
See application file for complete search history.

(56) References Cited

U.S. PATENT DOCUMENTS

| | | | | |
|---|---|---|---|---|
| 5,117,930 A | * | 6/1992 | Argouarc'h | B62D 55/065 180/41 |
| 5,155,423 A | * | 10/1992 | Karlen | B25J 9/04 318/568.1 |
| 5,739,655 A | * | 4/1998 | Torii | B62D 57/00 180/8.6 |
| 5,929,585 A | * | 7/1999 | Fujita | B62D 57/032 318/568.11 |
| 6,144,180 A | | 11/2000 | Chen et al. | |
| 6,267,196 B1 | | 7/2001 | Wilcox et al. | |
| 7,083,013 B2 | | 8/2006 | Chuan | |
| 7,348,747 B1 | * | 3/2008 | Theobold | B25J 5/005 318/568.11 |
| 7,757,794 B2 | * | 7/2010 | Heinzmann | B60L 11/007 180/282 |
| 7,878,276 B2 | * | 2/2011 | Limbacher, Jr. | B62D 57/02 180/8.1 |
| 8,061,461 B2 | | 11/2011 | Couture et al. | |
| 9,259,838 B1 | * | 2/2016 | Blankespoor | B25J 9/0006 |
| 2005/0055131 A1 | * | 3/2005 | Mikami | B62D 57/032 700/245 |
| 2006/0097683 A1 | * | 5/2006 | Hosoda | B25J 5/007 318/568.12 |
| 2006/0243499 A1 | * | 11/2006 | Hosoda | B62D 57/028 180/8.5 |
| 2008/0135312 A1 | * | 6/2008 | Nakamura | B62D 57/028 180/8.3 |
| 2009/0200090 A1 | * | 8/2009 | Takanishi | B25J 13/085 180/8.6 |
| 2010/0263948 A1 | * | 10/2010 | Couture | B25J 5/005 180/8.2 |
| 2011/0071677 A1 | * | 3/2011 | Stilman | B25J 5/007 700/254 |
| 2011/0106307 A1 | * | 5/2011 | Kim | B25J 9/1666 700/246 |
| 2011/0301785 A1 | * | 12/2011 | Sword | B62D 55/075 701/2 |
| 2012/0183382 A1 | * | 7/2012 | Couture | B25J 5/005 414/547 |
| 2014/0121840 A1 | * | 5/2014 | Mizuochi | E02F 9/265 700/275 |
| 2014/0305718 A1 | * | 10/2014 | Ohm | B25J 5/005 180/9.32 |
| 2016/0059408 A1 | * | 3/2016 | Isobe | B25J 5/007 700/253 |

* cited by examiner

*Primary Examiner* — Nicholas Kiswanto
(74) *Attorney, Agent, or Firm* — Fox Rothschild LLP; Robert J. Sacco; Carol E. Thorstad-Forsyth (57) ABSTRACT

Systems (100) and methods (600) for providing a robotic vehicle (100) with tip over prevention. The methods involve: determining a stability footprint, attitude and orientation of the robotic vehicle; computing a center of gravity of the robotic vehicle; projecting the center of gravity onto the stability footprint; determining whether the center of gravity is within an acceptable region of the stability footprint; calculating a new desired configuration for a movable component of the robotic vehicle when a determination is made that the center of gravity is within the acceptable region of the stability footprint; and commanding the movable component (106) to the new desired configuration.

20 Claims, 7 Drawing Sheets

UNMANNED GROUND VEHICLE STABILITY CONTROL

FIELD OF THE INVENTION

This document relates generally to Unmanned Ground Vehicles ("UGVs"). More particularly, this document relates to UGVs with stability control.

BACKGROUND OF THE INVENTION

UGVs are motorized vehicles that operate without an on-board human presence. Remotely-controlled and remotely-guided unmanned vehicles (such as UGVs) are in widespread use in applications such as Explosive Ordinance Disposal ("EOD"), search and rescue operations, hazardous material disposal, surveillance, etc. A typical UGV includes a chassis, wheels, drive motors mounted on the chassis, an articulating arm mounted on top of the chassis, grippers and a camera mounted on the arm. UGVs can also be equipped with steerable front wheels to facilitate directional control. Alternatively, UGVs can include tracks that facilitate operation over rough terrain. Steering of tracked UGVs can be effectuated by simultaneously operating the wheels or tracks on opposite sides of the UGV.

Movement and steering of an UGV can be controlled by a user from a location remote from the UGV using a joystick-equipped control unit. The control unit communicates with the UGV by way of a wireless communication link. The control unit may also be used to remotely control the UGV's robotic arm, gripper, and camera. Movement of the UGV is typically controlled by modulating the velocity of the UGV in proportion to the displacement of the joystick of the control unit.

UGVs are often used to in sloped and inclined areas (e.g., stairs, hills, slopes, rubble, etc.). In these scenarios, the UGVs are unstable. As a consequence of this instability, the UGVs may roll-over, whereby damage can be caused to the UGV and/or a mission can be jeopardized.

SUMMARY OF THE INVENTION

The present disclosure concerns implementing systems and methods for providing a robotic vehicle (e.g., a UGV) with tip over prevention. The methods involve performing operations by an electronic circuit to determine a stability footprint, attitude and orientation of the robotic vehicle. The stability footprint may be determined based on chassis-terrain contact points. The electronic circuit also: computes a center of gravity of the robotic vehicle; projects the center of gravity onto the stability footprint; determines whether the center of gravity is within an acceptable region of the stability footprint; calculates a new desired configuration for a movable component of the robotic vehicle (e.g., a manipulator arm or a flipper) when a determination is made that the center of gravity is within the acceptable region of the stability footprint; and commands the movable component to the new desired configuration. A speed of the robotic vehicle may be changed prior to commanding the movable component to the new desired configuration. The electronic circuit is disposed on or in the robotic vehicle which is traveling over sloped or inclined terrain.

In some scenarios, a configuration of the movable component of the robotic vehicle is measured by the electronic circuit. A determination is made as to whether the configuration of the movable component is optimal for stability. The new desired configuration is calculated when a determination is made that the configuration of the movable component is not optimal for stability.

Additionally or alternatively, movement of the movable component is constrained in accordance with at least one constraint parameter. The constraint parameter is selected by an operator of the robotic vehicle or automatically by the robotic vehicle based on a multi-dimensional model of a surrounding environment.

DETAILED DESCRIPTION OF THE DRAWINGS

Embodiments will be described with reference to the following drawing figures, in which like numerals represent like items throughout the figures, and in which.

DETAILED DESCRIPTION OF THE INVENTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, UGVs are often used in sloped and inclined areas (e.g., stairs, hills, slopes, rubble, etc.). Vehicle balance of the UGVs in the sloped and inclined areas is difficult to maintain, especially since various payloads (e.g., manipulator arms and cameras) are carried on top of the vehicle bases. The payloads cause the Center of Gravity ("CoG") of each UGV to be high relative to the vehicle base. The high CoG causes the UGV to have a relatively high probability of tipping over when traveling across sloped or inclined areas. If a UGV rolls over, then the UVG may be damaged. Also, the UGV may potentially be in an unrecoverable pose in which the UGV cannot be returned to its upright position.

Therefore, the present disclosure concerns systems and methods for tip over prevention of UGVs. The methods generally involve automatically and dynamically adjusting the CoG of the UGV while the UGV travels across a sloped or inclined area. The CoG is dynamically adjusted by continuously controlling the position and orientation of one or more movable payload components (e.g., a manipulator arm and/or flippers) disposed on a UGV's vehicle base. Notably, no manual efforts are required by an operator of the UGV to maintain vehicle balance through the period of time when the UGV crosses a sloped or inclined area.

All of the operations for maintaining vehicle balance are automatically performed by circuit components of the UGV during said period of time. These operations include, but are not limited to: measuring vehicle stability and attitude; and continuously adjusting the configuration(s) of the movable payload component(s) (e.g., manipulator arm) based on the measured vehicle stability and attitude. Techniques for measuring vehicle stability and attitude are well known in the art. Any known or to be known technique for measuring vehicle stability and attitude can be used herein without limitation.

Figure 1:
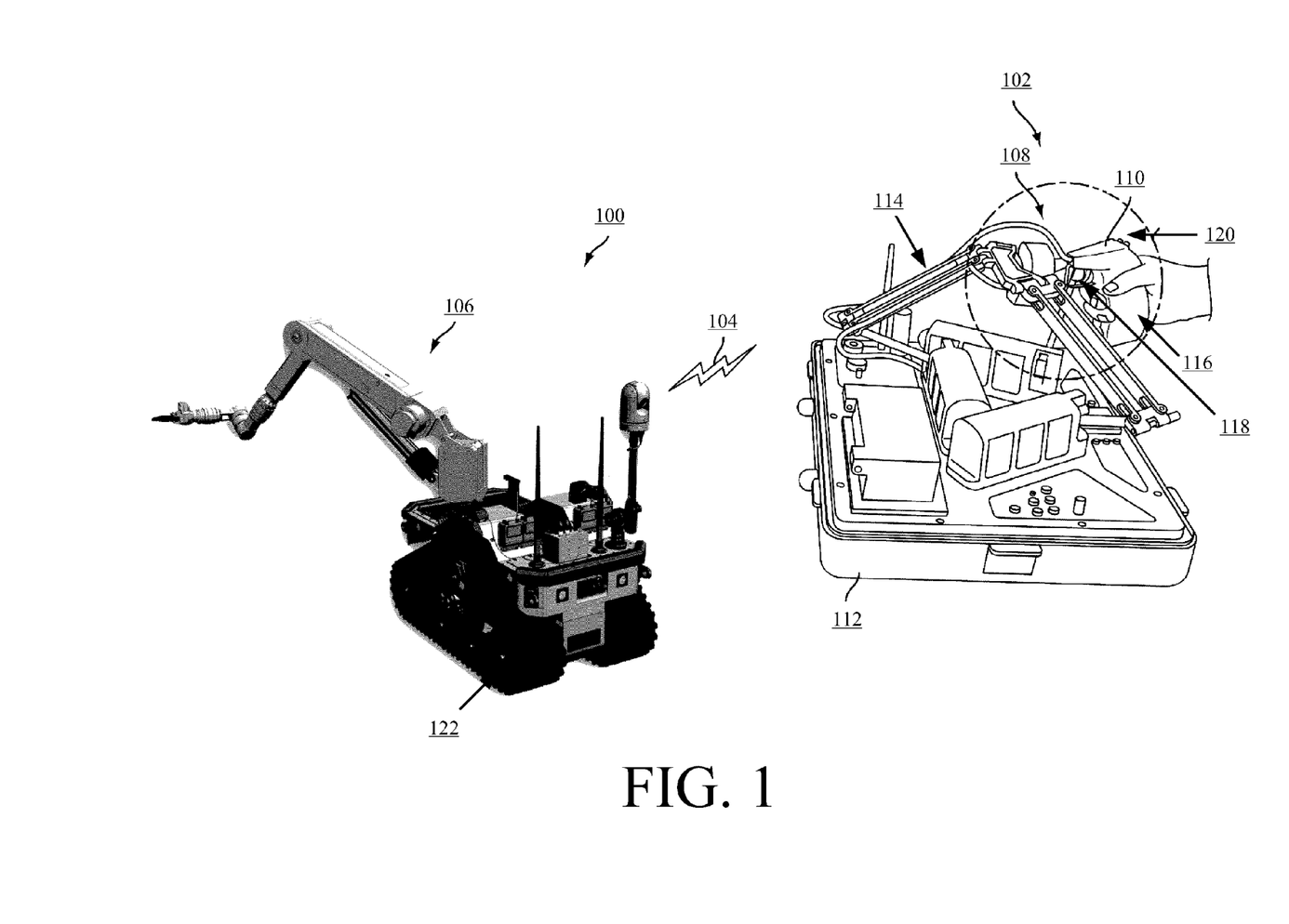
FIG. 1 is a perspective view of an UGV and a control unit.
Figure 2:
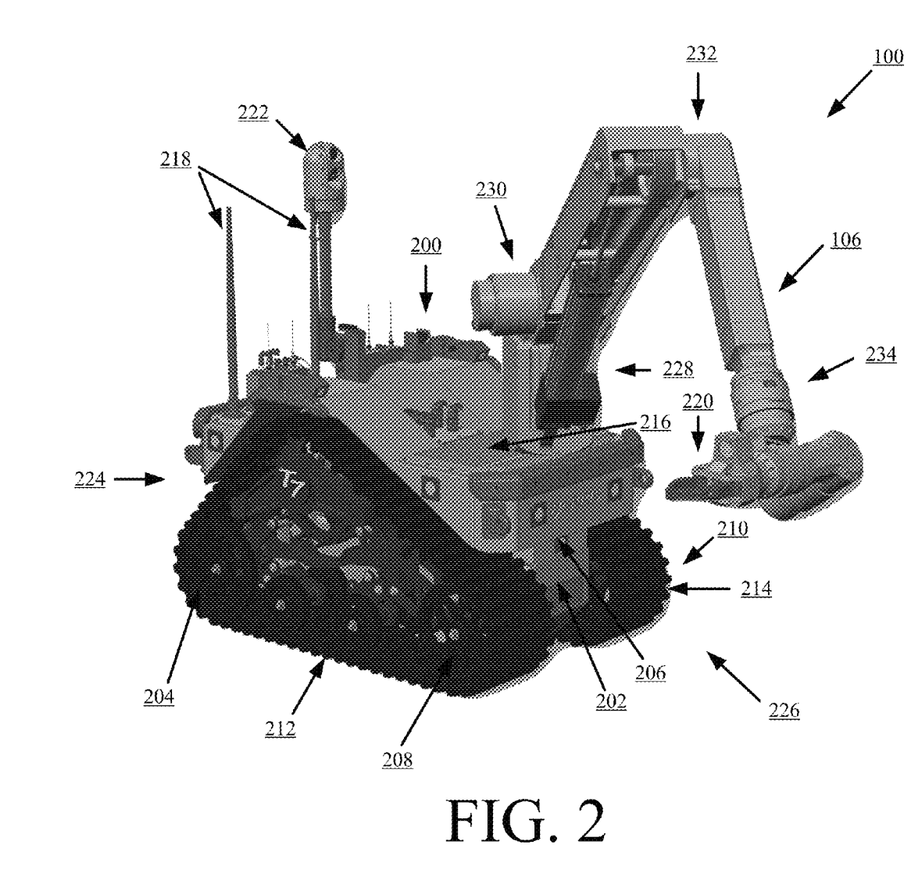
FIG. 2 is a perspective view of the vehicle shown in FIG. 1.

Referring now to FIGS. 1-4, there are provided schematic illustrations of an exemplary UGV 100 and control unit 102. The schematic illustrations of the UGV 100 and control unit 102 shown in FIGS. 1-2 are not drawn to scale. For example, the UGV 100 can be significantly larger than the control unit 102. However, FIGS. 1-2 are sufficient for understanding the present invention, and relationship between the two electronic components 100 and 102.

The UGV 100 is a motorized vehicle that operates without an on-board human presence. The UGV 100 can be used in various applications, such as EOD applications, search and rescue applications, hazardous material disposal applications, and/or surveillance applications. The UGV 100 can be remotely controlled using the control unit 102. In this regard, the control unit 102 enables a user's control of the UGV's operations and movement from a remote location.

The UGV 100 includes a body 200 comprising a rigid chassis 202. The UGV 100 also includes movable elements in the form of two rear wheels 204, 122 and two front wheels 208, 210. The rear wheels 204, 122 are mounted proximate a rear-end 224 of the rigid chassis 202 on opposite sides thereof. The front wheels 208, 210 are mounted proximate the frontend 226 of the rigid chassis 202 on opposite sides thereof. In alternative embodiments, the movable elements can be structures other than wheels, such as articulating legs.

Figure 3:
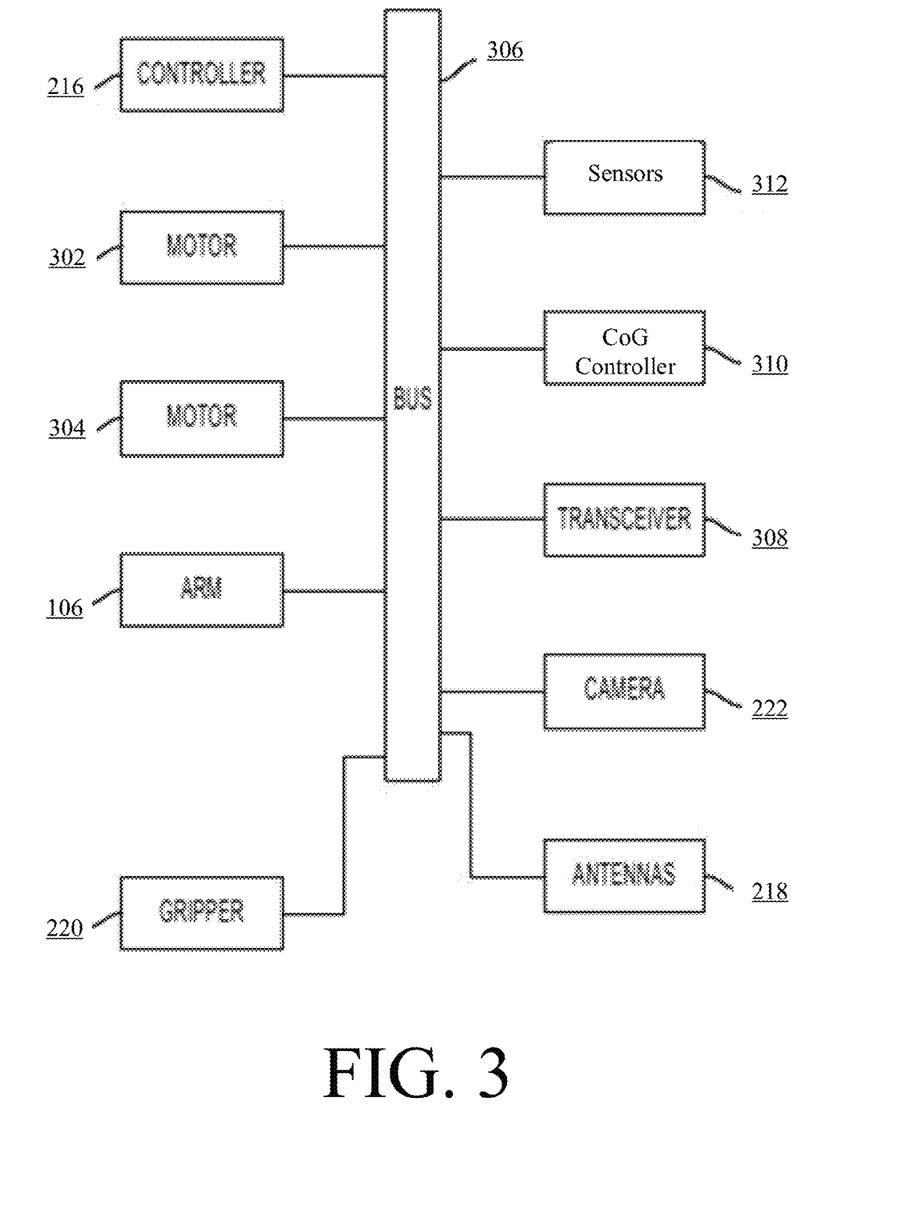
FIG. 3 is a schematic illustration of various electrical and electronic components of the vehicle shown in FIGS. 1-2.

The UGV 100 further comprises actuating devices in the form of two variable-speed, reversible electric motors 302, 304. The motors 302, 304 are mounted on the body 200. The motor 302 is coupled to the front wheel 208 so that activation of the motor 302 causes the front wheel 208 to rotate. The motor 304 is coupled to the front wheel 210 so that activation of the motor 304 causes the front wheel 210 to rotate. Additional motors (not shown) can be employed for directly driving the rear wheels 204, 122.

The rear wheel 204 and the front wheel 208 are located on the same side of the UGV 100. The rear wheel 204 and the front wheel 208 are coupled by way of a tread or track 212. Rotation of the front wheel 208 drives the track 212, which in turn causes the rear wheel 204 to rotate. Similarly, the rear wheel 122 and the front wheel 210 are located on the same side of the UGV 100. The rear wheel 122 and the front wheel 210 are coupled by way of a tread or track 214. Rotation of the front wheel 210 drives the track 214, which in turn causes the rear wheel 122 to rotate.

Figure 4:
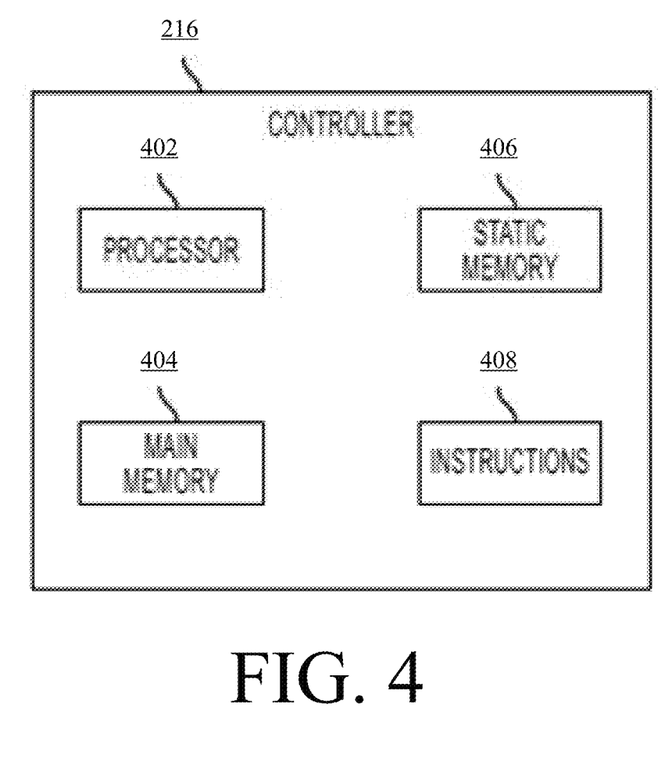
FIG. 4 is a schematic illustration of various electrical and electronic components of the controller shown in FIG. 3.

The UGV 100 further includes a controller 216. The controller 216 comprises a processor 402 (e.g., a Central Processing Unit ("CPU")), a main memory 404 and a static memory 406. These electronic components 402-406 communicate with each other via a bus 306. The static memory 406 stores one or more sets of instructions 408 (e.g., software code). The instructions 408 implement one or more of the methodologies, procedures, or functions described herein. The instructions 408 can also reside, completely or at least partially, within the main memory 404 or the processor 402 during execution thereof thereby. The main memory 404 and the processor 402 also can constitute machine-readable media.

A CoG controller 310 and sensors 312 are provided within the UGV 100. The sensors 312 can include, but are not limited to, inclinometers, Attitude and Heading Reference Sensors ("AHRS") and accelerometers. Outputs from the sensors 312 are used by the CoG controller 310 for tip over prevention of the UGV 100. Tip over prevention is achieved by automatically and dynamically adjusting the CoG of the UGV 100 while the UGV travels across a sloped or inclined area. The CoG is dynamically adjusted by continuously controlling the position and orientation of one or more movable payload components (e.g., a manipulator arm 106) disposed on the UGV's body 200. Notably, no manual efforts are required by an operator of the UGV to maintain vehicle balance through the period of time when the UGV crosses a sloped or inclined area.

All of the operations for maintaining vehicle balance are automatically performed by circuit components 310, 312 of the UGV during said period of time. These operations include, but are not limited to: continuously measuring and/or estimating vehicle stability, attitude and orientation; and continuously adjusting the configuration(s) of the movable payload component(s) (e.g., manipulator arm 106) based on the measured vehicle stability, the measured vehicle attitude, the vehicle's system mass model and/or the vehicle's acceleration/deceleration. The configuration of the movable payload component can be adjusted by controlling one or more joints thereof (e.g., joint 228, 230, 232 and/or 234 of FIG. 2).

Techniques for measuring vehicle stability and attitude are well known in the art. Any known or to be known technique for measuring vehicle stability footprint and attitude can be used herein without limitation.

In some scenarios, vehicle stability footprint is determined based on the location of the UGV's CoG relative to the chassis-terrain contact points (e.g., wheel-terrain or track-terrain contact points). Accordingly, a stability contact patch is estimated. Here, the stability contact patch constitutes the stability footprint. The stability contact patch comprises a polygon having vertices representing the points of the UGV chassis which are touching the ground. The stability polygon is defined as the convex hull of the polygon formed by chassis-terrain contact points projected onto a horizontal plane. Thereafter, the UGV's CoG is projected onto the stability contact patch. A determination is then made as to whether the UGV's CoG is within an acceptable region of the stability contact patch. The UGV's CoG can be projected straight down onto the contact patch in the direction of gravity. Alternatively, the UGV's CoG can be projected onto the contact patch in a direction other than the direction of gravity. This direction may be selected based on a weighted average of gravity, vehicle acceleration and/or vehicle deceleration. The UGV's CoG is determined to be within the acceptable region of the stability contact patch (e.g., the polygon) when it lies within the boundaries of the stability contact patch. If the CoG is near the boundary edges of the stability contact patch (e.g., the polygon), then an assumption is made that the UGV is about to tip over. In contrast, if the CoG is well within the stability contact patch (e.g., the polygon), then an assumption is made that the UGV is balanced.

Movement of the movable payload component may be constrained to prevent collisions with objects disposed within a surrounding environment (e.g., stair railings or other nearby obstacles). Such constraint of the payload's movement can be achieved in accordance with pre-specified algorithms and/or rules implemented by the CoG controller 310. The constraint parameters of the algorithms and/or rules may be user settable and/or pre-defined. The predefined constraint parameters can be automatically selected by the CoG controller 310 based on received sensor data (e.g., a 3D model of a surrounding environment). Alternatively or additionally, the pre-defined constraint parameters may be manually selected by an operator of the UGV 100.

The UGV 100 includes a transceiver 308 communicatively coupled to the processor 402 via the bus 306. The transceiver 308 communicates with the control unit 102 via a wireless communication link 104 (e.g., a Radio Frequency ("RF") transmission). One or more antennas 218 (is)are provided to facilitate the transmission and reception of information to and from the transceiver 308 of the UGV 100.

An articulating arm 106 is mounted on the body 200 of the UGV 100. The articulating arm 106 is equipped with at least one gripper 220, which is mounted on the freestanding end thereof. One or more cameras 206, 222 is(are) also mounted on the body 200 of the UGV 100. The articulating arm 106, gripper 220 and camera(s) 206, 222 can be remotely controlled via the control unit 102.

The position of the UGV 100 is controlled through the selective activation and deactivation of the motors 302, 304 in response to control inputs generated by the control unit 102. Linear or straight-line travel of the UGV 100 is effectuated by the simultaneous activation of motors 302, 304 in the same direction and at the same speed so as to drive tracks 212, 214 in the same direction and at the same speed. Turning of the UGV 100 can be achieved by (1) simultaneously activating the motors 302, 304 in opposite directions or in the same direction at different speeds or (2) operating only one of the motors 302, 304.

Figure 5:
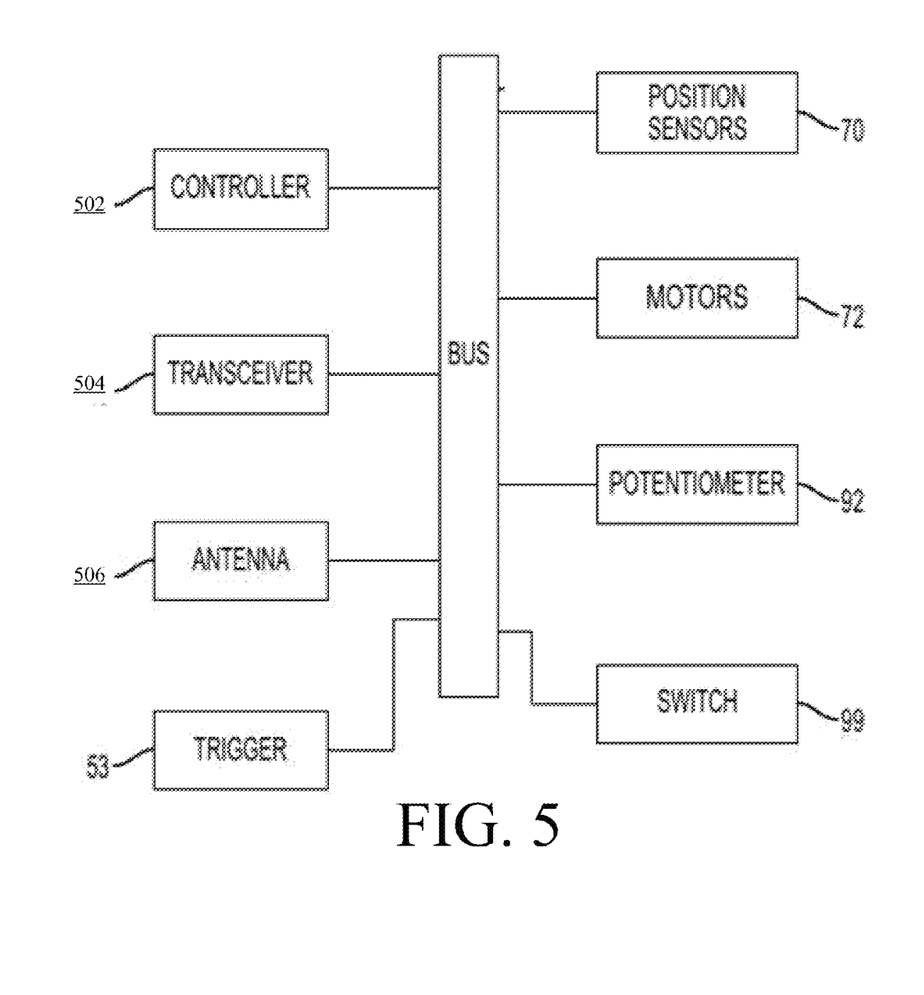
FIG. 5 is a schematic illustration of various electrical and electronic components of the control unit shown in FIG. 1.

The control unit 102 comprises a controller 502. The controller 502 is similar to or the same as the controller 216 of the UGV. As such, the controller 502 may include a processor (not shown) and memory (not shown) housed in a rigid casing (not shown). Instructions (not shown) may be stored in the memory. The instructions can be implemented as software code configured to implement one or more of the methodologies, procedures, or functions described herein. The processor and memory can constitute machine-readable media.

The control unit 102 also includes a wireless transceiver 504 communicatively coupled to the controller 502. The transceiver 504 is configured to communicate with the transceiver 308 of the UGV 100 via an RF communication link 104. An antenna 506 is provided to facilitate the transmission and reception of RF signals to and from the control unit 102.

The control unit 102 further comprises an input device 108 for providing user inputs to the controller 502. In some scenarios, the input device 108 comprises a joystick to command the vehicle's movement. In other scenarios, the input device 108 comprises a hand grip 110 movably coupled to a base 112 via a plurality of linkages 114. The hand grip 110 includes a body 116 and a trigger 118. The body 116 is sized and shaped to be grasped by the hand of an operator. The trigger 118 is movable between a rest position and a fully depressed position. In this regard, the trigger 118 is mounted on the body 116 so that the user can pull or depress the trigger using his or her index finger while grasping the hand grip 110. Buttons 120 are disposed on the hand grip 110 for providing a means to control the grippers 220, camera 222 and other operational features of the manipulator arm 106.

Figure 6A:
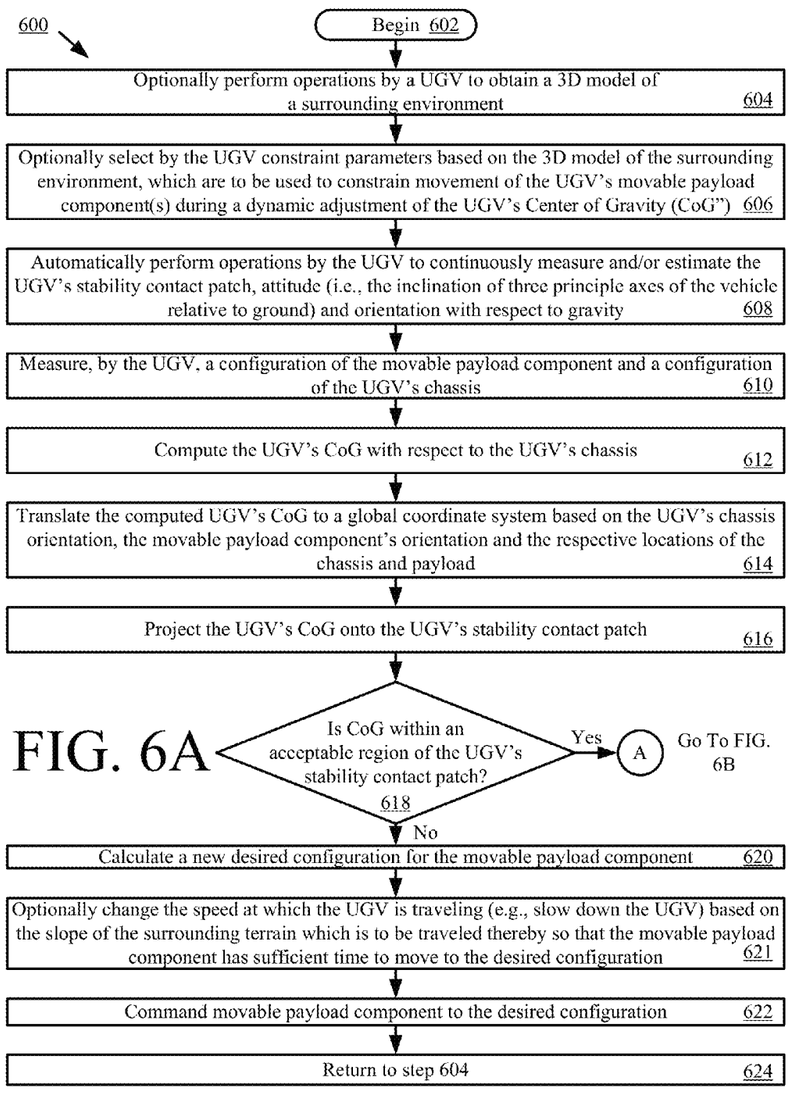
FIGS. 6A-6B (collectively referred to herein as "FIG. 6") provide a flow diagram of an exemplary method for providing a UGV with tip over prevention.

Referring now to FIG. 6, there is provided a flow diagram of an exemplary method 600 for providing a UGV (e.g., UGV 100 of FIG. 1) with tip over prevention. Method 600 begins with step 602 and continues with optional step 604. In optional step 604, operations are performed by the UGV to obtain a 3D model of a surrounding environment. Based on the 3D model, the UGV can optionally select constraint parameters which are to be used to constrain movement of the UGV's movable payload component(s) (e.g., manipulator arm 106 of FIG. 1) during a dynamic adjustment of the UGV's CoG, as shown by step 606. As noted above, some or all of the constraint parameters may additionally or alternatively be selected by the operator.

In a next step 608, the UGV automatically performs operations to continuously measure and/or estimate the UGV's stability, attitude (i.e., the inclination of three principle axes of the vehicle relative to ground) and orientation with respect to gravity. Techniques for measuring and estimating vehicle stability contact patch, attitude and orientation are well known in the art. Any known or to be known technique for measuring and estimating vehicle stability contact patch, attitude and orientation can be used herein without limitation.

In some scenarios, vehicle stability is determined based on the location of the UGV's CoG relative to the chassis-terrain contact points. Accordingly, a stability contact patch is estimated. The stability contact patch may comprise a polygon having vertices representing the points of the UGV chassis which are touching the ground. The stability polygon is defined as the convex hull of the polygon formed by chassis-terrain contact points projected onto a horizontal plane.

After step 608, step 610 is performed where the UGV measures a configuration of the movable payload component and a configuration of the UGV's chassis (e.g., flipper angles). In this regard, sensor information is obtained from some or all of the sensors of the movable payload component and/or UGV's chassis. For example the sensor information specifies the joint angles of a manipulator arm. Techniques for measuring the configurations of payload and chassis are well known in the art. Any known or to be known technique for measuring the configurations of payload and chassis can be used herein without limitation.

Thereafter, step 612 is performed where the UGV's CoG is computed with respect to the UGV's chassis (e.g., rigid chassis 202 of FIG. 2). Techniques for computing vehicle CoG are well known in the art. Any known or to be known technique for computing vehicle CoG can be used herein without limitation. For example, a coordinate frame is fixed to the UGV's chassis at a known location (e.g., a top of the UGV's chassis deck). The coordinate frame may include an x-axis, a y-axis and a z-axis. Regardless of the UGV's orientation, the position of the CoG is defined in terms of an x-axis value, a y-axis value and a z-axis value. The result of the CoG computation is then translated to a global coordinate system, as shown by step 614. The translation can be based on the UGV's orientation, the movable payload component's orientation and the respective locations of the UGV's chassis and payload.

In a next step 616, the result of the CoG translation is then projected onto the UGV's stability contact patch. Techniques for projecting coordinates onto a stability contact patch are well known in the art. Any known or to be known technique for projecting coordinates onto a stability contact patch can be used herein without limitation. In some scenarios, the UGV's CoG can be projected straight down onto the stability contact patch in the direction of gravity. Alternatively, the UGV's CoG can be projected onto the stability contact patch in a direction other than the direction of gravity (i.e., a direction at an angle relative to the direction of gravity). This direction may be selected based on a weighted average of gravity, vehicle acceleration and/or vehicle deceleration.

Upon completing step 616, a decision step 618 is performed to determine if the CoG is within an acceptable region of the UGV's stability contact patch. The term "acceptable region", as used herein, refers to a portion of the stability contact patch selected to ensure that the UGV will be stable within a stability safety margin. For example, the acceptable region may include an area that is defined by the portion of the stability contact patch which has boundary lines N inches (e.g., 8 inches) from all boundary lines of the stability contact patch. The determination of step 618 can be made in accordance with one or more pre-defined rules and/or algorithms.

For example, the UGV's CoG is determined to be within the acceptable region of the stability contact patch when it lies within the boundary thereof. In this case, the UGV is considered balanced. The UGV's CoG is determined not to be within the acceptable region of the stability contact patch when it lies outside the boundary edges thereof. In this case, the UGV is considered unbalanced, and therefore is likely going to tip over. The present invention is not limited to the particulars of this example.

If a determination is made that the UGV's CoG is not within the acceptable region of the stability contact patch [618:NO], then method 600 continues with steps 620-624. Steps 620-624 involve: calculating a new desired configuration for the movable payload component; optionally changing the speed at which the UGV is traveling (e.g., slow down the UGV based on the slope of the surrounding terrain which is to be traveled thereby so that the movable payload component has sufficient time to move to the desired configuration; commanding the movable payload component to the desired configuration; and subsequently return to step 604. The commanding is achieved using the particulars of the new desired configuration for the movable payload component and/or the previously measured configuration of movable payload component (see step 610).

As should be understood, the slope of the terrain may change relatively quickly. In contrast, the movable payload component (e.g., manipulator arm) on the UGV is likely to not be able to move very fast. Accordingly, the automatic balancing scheme employed herein is able to slow down or limit the driving speed of the UGV if the vehicle has marginal stability (i.e., the CoG is outside the acceptable region). By slowing down the UGV, it decreases the rate at which the angle of the UGV changes and gives the movable payload component time to move to a desired configuration that provides better UGV balance.

Notably, there are known vehicle balance control schemes that change the speed thereof for vehicle balancing purposes (i.e., to keep the vehicle balanced). However, the present approach is distinguishable from these known balance control schemes. In this regard, it should be emphasized that the present balancing scheme only slows down the UGV in order to provide sufficient time for the movable payload component to be repositioned.

Figure 6B:
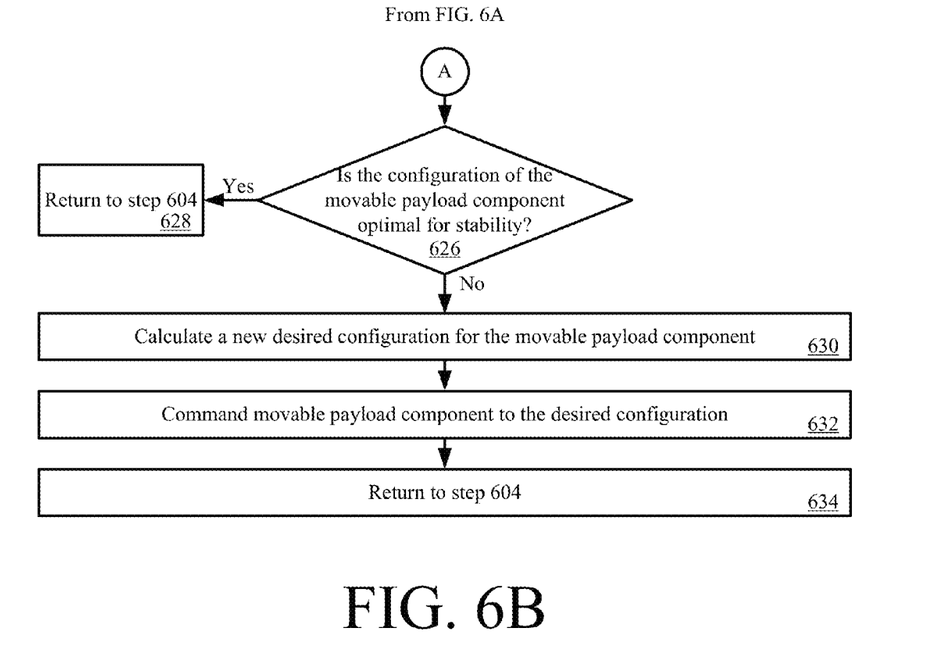

If a determination is made that the UGV's CoG is within the acceptable region of the stability contact patch [618:YES], method 600 continues with steps 626-634 of FIG. 6B. Step 626 is a decision step in which a determination is made as to whether the configuration of the movable payload component is optimal for stability. If the configuration of the movable payload component is optimal for stability [626:YES], then step 628 is performed where method 600 returns to step 604. In contrast, if the configuration of the movable payload component is not optimal for stability [626:NO], then steps 630-634 are performed. Steps 630-634 involve: calculating a new desired configuration for the movable payload component; commanding the movable payload component to the desired configuration; and subsequently return to step 604.

In view of the forgoing, the disclosure concerns systems and methods for automatically maintaining the balance of a mobile robotic platform including a mobile base, at least one movable payload component (e.g., a manipulator arm), and at least one sensor configured to determine the orientation of the system with respect to ground. A control system is used to automatically reconfigure/reposition the movable payload component in response to changes in vehicle orientation. The position/orientation of the movable payload component is continuously adjusted in order to control/maintain the balance of the system. In some scenarios, acceleration/deceleration data is used to further improve the calculation of the optimal configuration of the movable payload component for maintaining stability. Also, movement of the movable payload component may be constrained.

Notably, the present invention has various advantages. For example, the UGV's of the present invention have the ability to adjust balance is all directions. Such adjustment is achieved automatically without any human intervention. Also, no special mechanisms are required to facilitate such automatic balance adjustments. As such, the present invention is relatively inexpensive to implement.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for providing a robotic vehicle with tip over prevention, comprising:
   determining, by an electronic circuit, a stability footprint, attitude and orientation of the robotic vehicle, where the electronic circuit is disposed on or in the robotic vehicle which is traveling over sloped or inclined terrain;
   computing, by the electronic circuit, a center of gravity of the robotic vehicle;
   projecting, by the electronic circuit, the center of gravity onto the stability footprint;
   determining, by the electronic circuit, whether the center of gravity is within an acceptable region of the stability footprint;
   calculating a new desired configuration for a movable component mounted on a body of the robotic vehicle when a determination is made that the center of gravity is not within the acceptable region of the stability footprint; and
   dynamically selectively changing the center of gravity of the robotic vehicle by commanding the movable component to the new desired configuration so as to shift the robotic vehicle's weight for preventing vehicle tip over while the robotic vehicle travels across a sloped or inclined area;
   wherein a driving speed of the robotic vehicle is limited for a period of time that is sufficient for the movable component to move to the new desired configuration.

2. The method according to claim 1, wherein the stability footprint is determined based on chassis-terrain contact points.

3. The method according to claim 1, further comprising measuring, by the electronic circuit, a configuration of the movable component of the robotic component.

4. The method according to claim 3, further comprising determining if a configuration of the movable component is optimal for stability when the center of gravity is within the acceptable region of the stability footprint.

5. The method according to claim 4, wherein the new desired configuration is calculated when a determination is made that the configuration of the movable component is not optimal for stability.

6. The method according to claim 1, further comprising constraining movement of the movable component in accordance with at least one constraint parameter.

7. The method according to claim 6, wherein the constraint parameter is selected by an operator of the robotic vehicle or automatically by the robotic vehicle based on a multi-dimensional model of a surrounding environment.

8. The method according to claim 1, wherein the movable component is a manipulator arm and the robotic vehicle is an unmanned ground vehicle.

9. The method according to claim 1, wherein the center of gravity is computed in a first coordinate system with respect to a chassis of the robotic vehicle, and translated from the first coordinate system to a second coordinate system.

10. A method for providing a robotic vehicle with tip over prevention, comprising:
    determining, by an electronic circuit, a stability footprint, attitude and orientation of the robotic vehicle, where the electronic circuit is disposed on or in the robotic vehicle which is traveling over sloped or inclined terrain;
    computing, by the electronic circuit, a center of gravity of the robotic vehicle;
    projecting, by the electronic circuit, the center of gravity onto the stability footprint;
    determining, by the electronic circuit, whether the center of gravity is within an acceptable region of the stability footprint;
    calculating a new desired configuration for a movable component mounted on a body of the robotic vehicle when a determination is made that the center of gravity is not within the acceptable region of the stability footprint;
    dynamically selectively changing the center of gravity of the robotic vehicle by commanding the movable component to the new desired configuration so as to shift the robotic vehicle's weight for preventing vehicle tip over while the robotic vehicle travels across a sloped or inclined area; and
    limiting a driving speed of the robotic vehicle prior to commanding the movable component to the new desired configuration and for a period of time that is sufficient for the movable component to move to the new desired configuration.

11. A robotic vehicle, comprising:
    an electronic circuit disposed on or in the robotic vehicle which performs operations when the robotic vehicle is traveling over a sloped or inclined area to:
        determine a stability footprint, attitude and orientation of the robotic vehicle;
        compute a center of gravity of the robotic vehicle;
        project the center of gravity onto the stability footprint;
        determine whether the center of gravity is within an acceptable region of the stability footprint;
        calculate a new desired configuration for a movable component of the robotic vehicle when a determination is made that the center of gravity is not within the acceptable region of the stability footprint; and
        dynamically selectively change the center of gravity of the robotic vehicle by commanding the movable component to the new desired configuration so as to shift the robotic vehicle's weight for preventing vehicle tip over while the robotic vehicle travels across a sloped or inclined area;

wherein a driving speed of the robotic vehicle is limited for a period of time that is sufficient for the movable component to move to the new desired configuration.

12. The robotic vehicle according to claim 11, wherein the stability footprint is determined based on chassis-terrain contact points.

13. The robotic vehicle according to claim 11, wherein the electronic circuit further performs operations to measure a configuration of the movable component of the robotic component.

14. The robotic vehicle according to claim 13, wherein the electronic circuit further performs operations to determine if a configuration of the movable component is optimal for stability when the center of gravity is within the acceptable region of the stability footprint.

15. The robotic vehicle according to claim 14, wherein the new desired configuration is calculated when a determination is made that the configuration of the movable component is not optimal for stability.

16. The robotic vehicle according to claim 11, wherein the electronic circuit further performs operations to constrain movement of the movable component in accordance with at least one constraint parameter.

17. The robotic vehicle according to claim 16, wherein the constraint parameter is selected by an operator of the robotic vehicle.

18. The robotic vehicle according to claim 16, wherein the constraint parameter is selected automatically by the robotic vehicle based on a multi-dimensional model of a surrounding environment.

19. The robotic vehicle according to claim 11, wherein the movable component is a manipulator arm and the robotic vehicle is an unmanned ground vehicle.

20. The robotic vehicle according to claim 11, wherein the center of gravity is computed in a first coordinate system with respect to a chassis of the robotic vehicle, and translated from the first coordinate system to a second coordinate system.

* * * * *